May 13, 1969     E. E. HULSEY     3,443,793

VARIABLE AREA ORIFICE, ROTARY CONTROL VALVE

Filed Dec. 23, 1966

Eldon E. Hulsey
INVENTOR.

BY

ATTORNEY

Eldon E. Hulsey
INVENTOR.

BY

ATTORNEY

Eldon E. Hulsey
INVENTOR.

BY

ATTORNEY

Eldon E. Hulsey
INVENTOR.

BY
ATTORNEY

United States Patent Office 3,443,793
Patented May 13, 1969

3,443,793
VARIABLE AREA ORIFICE, ROTARY CONTROL VALVE
Eldon E. Hulsey, 5747 Warm Springs,
Houston, Tex. 77035
Continuation-in-part of application Ser. No. 492,475, Oct. 4, 1965. This application Dec. 23, 1966, Ser. No. 604,414
Int. Cl. F16k 5/04, 5/10
U.S. Cl. 251—209                       16 Claims

ABSTRACT OF THE DISCLOSURE

A rotary control valve of the plug or ball-type having spiral variable area orifice flow port and flow passage designs adapted to permit selective and variable control of fluid flow over a wide range of settings while maintaining at all settings substantially straight-line or through-conduit flow.

This application is a continuation-in-part of my copending application Ser. No. 492,475, filed Oct. 4, 1965, for Variable Orifice Plug-Type Valve.

BACKGROUND OF THE INVENTION

The invention is directed to improvements in control valves and more particularly in control valves of the rotary type. This type includes generally those forms of valves commonly known as plug valves and ball valves.

More specifically, the invention is directed to improvements in rotary type valves enabling employment of such valves as regulator or control valves which will permit a wide range of settings of the valve between the open and close positions while, at all such settings, maintaining straight-line or through-conduit flow through the valve.

Present control or regulating valves are generally of the globe or needle type which, by nature of their constructions, necessarily produce sharp changes in direction of flow of fluid through the valve, particularly at throttling settings, with resultant high rates of erosion, severe vibration, and substantial pressure drops even in the full open position, particularly when controlling high pressure, high volume fluid flows.

In the transmission of large volume, high pressure gas streams, for example, the changes in direction occurring in conventional regulating valves results in a high degree of turbulence and substantial pressure drop even in the full open position, with accompanying temperature reduction which is favorable to the formation of solid hydrates, when moisture is present in the gas. These hydrates tend to clog the valve passages and causes operating and regulating difficulties well-known to those experienced in this art.

The various deficiencies and problems connected with prior art regulating and control valves are overcome by the provision, in accordance with this invention, of an improved rotary-type valve.

Rotary valves of the plug or ball type, while of comparatively simple construction as compared with globe and needle type valves commonly used for fluid flow regulation or control, have not heretofore been used for such operations, because of their limited angular movement, 90°, from fully open to fully closed positions, and because the shapes of their flow passages do not permit close control of fluid flow through the valves. Moreover, in their partly open positions, surfaces are interposed in the path of fluid flow causing abrupt changes in direction of flow which, as noted previously, will often be accompanied by severe erosion and vibration and undesirable pressure drops even when the valve is fully open.

SUMMARY

Valves, in accordance with the present invention, may be described generally as rotary-type angle valves. They are angle valves in the sense that the flowway through the valve, as determined by opposed inlet and outlet openings, is at an acute angle not greater than 45° to the main or longitudinal axis of the valve casing, so that when the casing is installed in a flow conduit with the flowway of the valve substantially coaxial with the flow conduit, the valve casing will be disposed at an angle to the axis of the flow conduit.

The casing encloses a chamber in which the closure member is rotatably mounted, the shape of the chamber, as in conventional rotary valves, corresponding closely to that of the closure member which, as previously noted, may be cylindrical, frusto-conical or ball-shaped. The closure member is disposed in the casing for rotation about an axis which is coincident with the main or longitudinal axis of the casing mentioned above. The closure member is provided with a flow passage which extends through the body of the closure member, generally at the same acute angle as that of the flowway so as to register with the latter in the valve-open position.

The flow passage through the closure member has at least one end thereof shaped to form a slot extending circumferentially of the body of the closure member and defined by convergent walls which are inclined so as to intersect the flow passage at an acute angle which is preferably substantially equal to but opposite the angle of the flow passage. The slot, in development, will be of elongate, generally triangular configuration with an arcuate base, and will extend circumferentially of the body of the closure member an angular distance, generally greater than 90°, and preferably from about 180° to about 270°. The nonslotted portion of the closure member remaining between the opposite ends of the slot defines a closure portion adapted to close off the related opening in the valve casing when the closure member has been rotated to the flowway-closing position.

As the slot of the described shape is rotated past the flowway opening, a flow orifice through the valve is created which will vary in effective cross-sectional area in accordance with the angular position of the slot relative to the casing opening, while at the same time, the direction of flow of fluid through the valve will be maintained in a generally straight-line or through-conduit connection.

The orifice slot may also be described as a spiral slot decreasing in width throughout its length and inclining at an angle to the longitudinal axis of the plug passageway, whereby the inner wall of the slot describes a conic surface sloping inwardly to an apex which is substantially coincident with the longitudinal axis of the passageway.

In a preferred embodiment, the closure member is of the balanced type, being generally cylindrical in shape, having its opposite ends identical in all respects, and having axially disposed stems of equal cross-section projecting from both ends thereof and suitably journalled in end caps or bonnets secured to and closing the opposite ends of the valve casing. In this embodiment, the flow passage through the plug member will be generally cylindrical, terminating at its opposite ends in identical orifice slots of the form previously described. In this embodiment, the orifice slots will be angularly offset and extend in opposite directions circumferentially of the closure member and sloping inwardly of the closure member toward one another. The offset will be such as to provide nonslotted portions on opposite sides of the closure member adapted to register with the casing flow ports in the closed position.

Other and more specific objects and advantages of this invention will become more readily apparent from the following detailed description when read in conjunction with the accompanying drawing which illustrates several useful embodiments in accordance with this invention.

DESCRIPTION

Referring first to FIGS. 1 to 10, inclusive, which illustrate a preferred balanced-type valve in accordance with this invention, the valve includes a casing 10 having a generally cylindrical bore defining a chamber 11 adapted to receive a closure member; designated generally by the numeral 12, of generally cylindrical shape snugly fitting the bore wall of chamber 11, the wall forming a seat for the closure member. Closure member 12 is provided with oppositely extending cylindrical extensions or stems 13—13 of identical cross-sectional area provided with transverse notches 14 at the outer ends of the stems. Notches 14 are intended, in the form shown, to symbolically represent means for connecting a valve operator of any suitable and generally conventional form adapted to rotate closure member 12 in operation of the valve. The opposite ends of casing 10 are closed by means of end caps or bonnets 15—15 having central openings 16—16 to receive stems 13 and provided with suitable packing 17 for sealing off about the stems. Additional packing 18 is provided between the bonnets and the wall of chamber 11 to close the ends of the chamber about the closure member.

Figure 1:
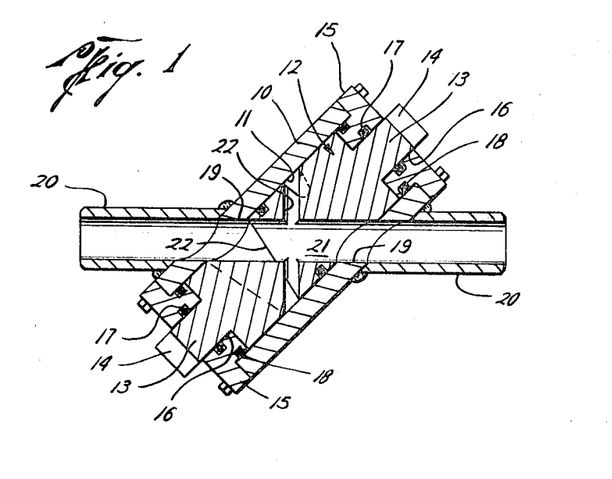
FIG. 1 is a transverse cross-sectional view of one embodiment of a valve in accordance with this invention, the closure member being of cylindrical and symmetrical configuration, and illustrated in the fully open position.

Casing 10 is provided with registering openings 19—19 at diametrically opposite sides of the casing disposed on an axis extending at an acute angle to the longitudinal axis of casing 10. Openings 19 define the inlet and outlet flow ports for the valve to which are connected nozzles 20—20 by means of which the valve may be connected into a flow conduit to be controlled by the valve.

As so arranged, it will be seen that the valve is of the so-called "angle" type, in that the main axis of the valve casing is disposed at an acute angle with respect to the longitudinal axis of flow conduit in which it is mounted.

Closure member 12 is, as previously noted, of cylindrical shape and, as best seen in FIGS. 4 to 7, inclusive, has a flow passage 21 extending therethrough along an axis $b$—$b$ at an acute angle $x$ with respect to the longitudinal axis of the closure member, indicated by the broken line $a$—$a$, so as to be coincident with the axis of the flowway through the valve when the closure member is in the valve-open position. The basic shape of flow passage 21 is generally cylindrical. The opposite ends, however, terminate in orifice slots 22 of identical shape, but oppositely oriented, as will appear subsequently.

Figure 3:
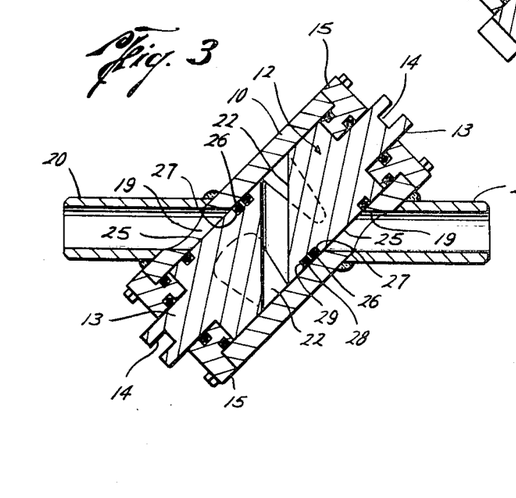
Figure 4:
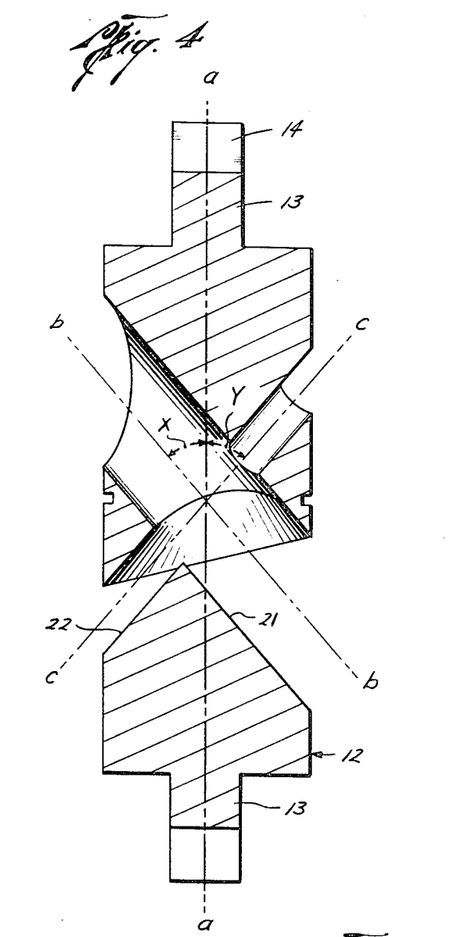
FIG. 4 is a longitudinal axial sectional view of the closure member illustrated in FIGS. 1, 2 and 3, the section being taken along line 4—4 of FIG. 5.
Figure 5:
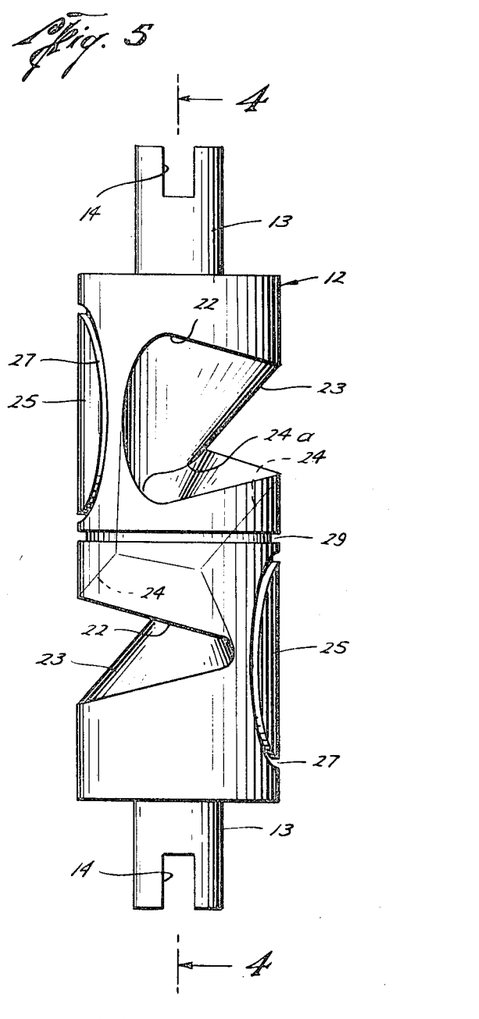
FIGS. 5, 6 and 7 are elevational views of the closure member taken at different angular positions thereof.
Figure 6:
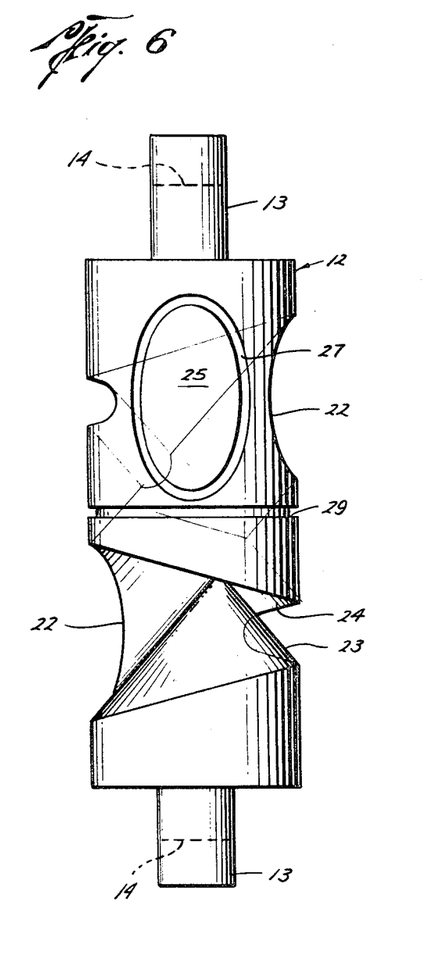
Figure 7:
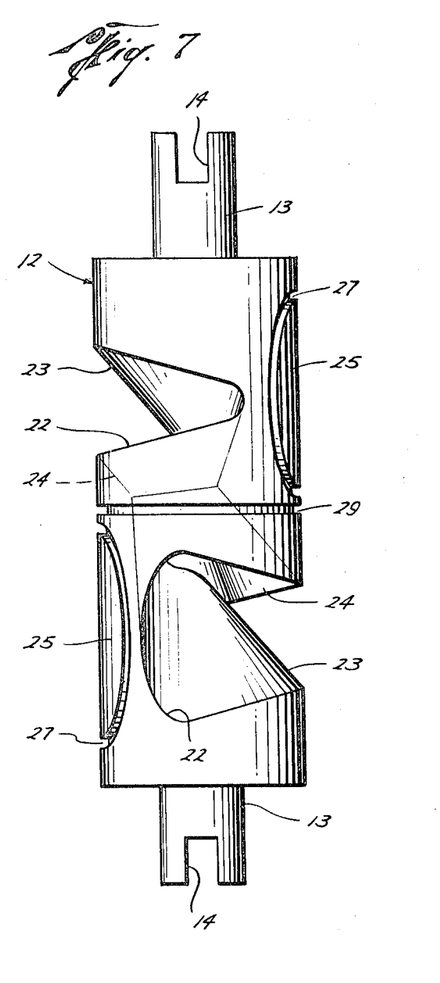
Figure 18:
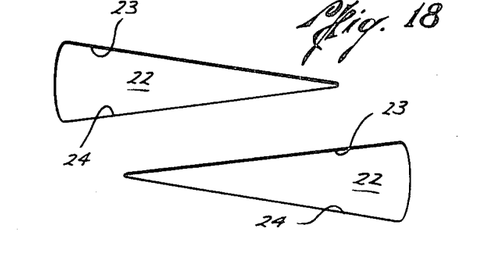
FIG. 18 is a view showing the general configuration of the orifice slots of the several illustrative embodiments.

As previously described, slots 22 extends generally circumferentially of the closure member and are defined by convergent walls 23, 24 which are inclined inwardly of the body of the closure member so as to intersect flow passage 21 at an acute angle $y$, which is preferably equal to but opposite the angle $x$ of the flow passage, as indicated by axial center line $c$—$c$ in FIG. 4. In development, slots 22 will have an elongate, generally triangular configuration with arcuate bases and will be oriented to extend in oppoosite directions about the closure body and to be angularly offset, as illustrated in FIG. 18. The non-slotted portions of the body between the opposite ends of the slots 22 define closure portions 25 adapted to register with the related flow ports 19 in the flowway-closing position of the closure member. Closure portions 25 may be enclosed by seal rings 26, such as conventional O-rings, seated in elliptically shaped grooves 27 to form fluid-tight seals around each of the flow ports 19 when the valve is in the flowway-closing position, FIG. 3. A circumferential seal ring 28 is seated in a suitable groove 29 extending circumferentially about the closure member at its midpoint, whereby to seal off the closure chamber between the inlet and outlet ends thereof.

In general, the arcuate length of each slot 22 will be greater than 90° and preferably from about 180° to 270°. This extended length of the slot will permit rotation of the closure member through an angle up to 270° between its fully closed and fully opened positions, thereby providing an extended range of variation in the orifice area for accurately controlling flow of fluid through the valve.

Figure 8:
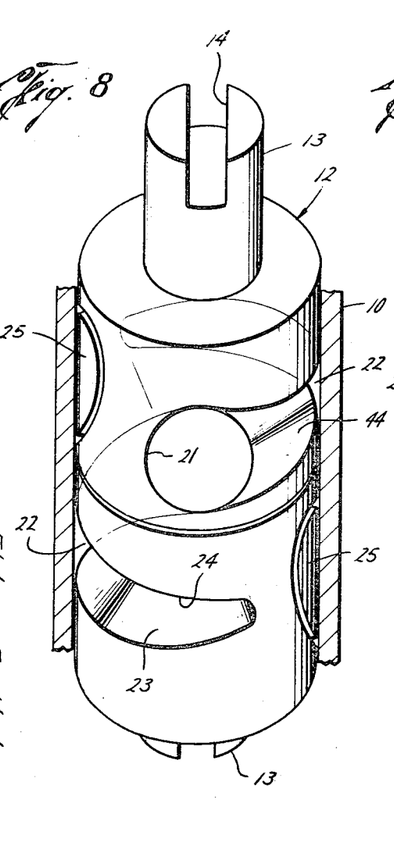
FIGS. 8, 9 and 10 are perspective elevational views of the closure member viewed at an angle corresponding to the longitudinal axis of the flow passage through the closure member, the several views illustrating the change in area of the flow passage as the closure member is rotated from the fully open position, through an intermediate open position, to the minimum open position.
Figure 9:
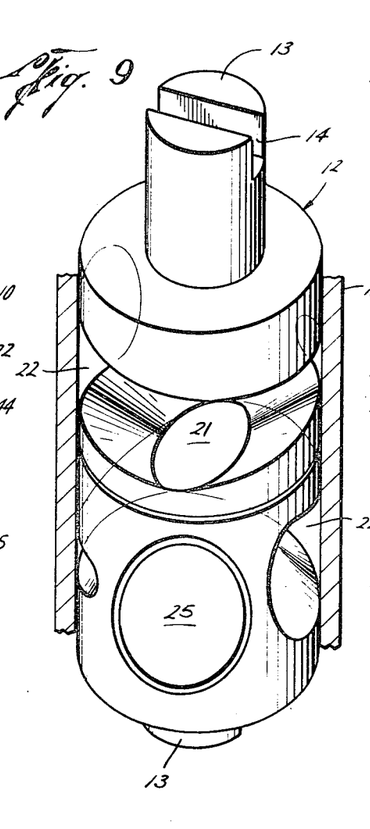
Figure 10:
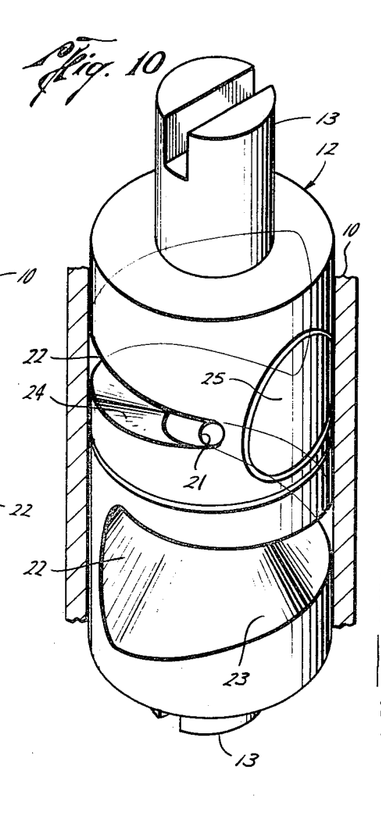

By constructing the slots to have the configuration described, it will be seen that inner wall 23 will describe a surface of inwardly sloping, generally conical shape having its apex 24a nearly coincident with the longitudinal axis of flow passage 21. As a result of the respective shapes and disposition of the slots and flow passage, it will be seen that at any angular position of slots 22, with respect to flow ports 19, a flow passage will be provided through the valve which will be generally straight line, that is, parallel to the longitudinal axis of flow passage 21 at all positions between maximum or fully open and minimum open. This characteristic of the valve is best illustrated in FIGS. 8 to 10 where the closure member is illustrated as viewed along the axis of the flowway through the valve. It will be seen that in the fully open position (FIG. 8) flow passage 21 will be coincident and flush with flow ports 19. FIG. 9 shows an intermediate open position, and while the opening defined by flow passage 21 is shown to be somewhat elliptical rather than circular, it nevertheless defines a substantial straight-line passageway through the closure member and the valve. In FIG. 10, the opening defining flow passage 21 is at the minimum open dimension, but again, it will be seen that the passage is generally circular and coaxial with the flowway through the valve. It should be noted that when the valve is viewed along the axis of the flowway defined by ports 19, flow passage 21 will give the appearance of a radially expanding and contracting orifice as the slots in the closure member are rotated past flow ports 19.

Figure 2:
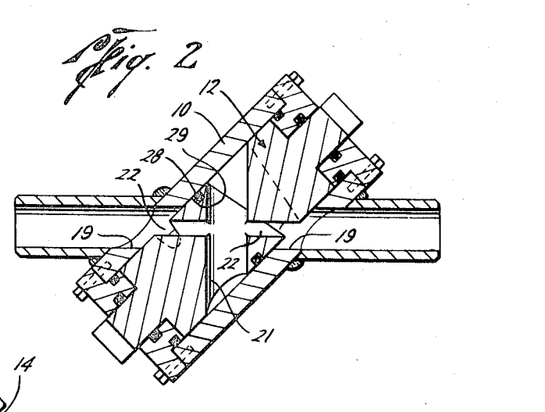
FIGS. 2 and 3 are views similar to FIG. 1 showing the closure member respectively in minimum open and fully closed positions.

The cross-sectional views illustrated in FIGS. 1 and 2 show the straight-line flow path through the valve at fully open and partially open positions of the closure member. FIG. 3 illustrates the fully closed position wherein closure portions 25 are shown in sealing position over the related flow ports 19. Packing 28 precludes fluid leakage from one side of the valve to the other.

With the symmetrical balanced construction of the embodiment illustrated in FIGS. 1 to 10, the closure member may be turned end-for-end, if desired, so that either end may be connected to an operator, or for any other reason which may make it desirable or expedient to so reverse the ends of the closure member.

Angles $x$ and $y$ are, as previously noted, acute angles and preferably will be in the range from about 30° to slightly less than 45°, depending on the size of the valve, that is, the diameter of the flowway through the valve. In general, the larger the flowway diameter, the larger the angle. For example, in a nominal 2 inch valve, angles $x$ and $y$ will be approximately 37°, while in a nominal 20 inch valve, these angles will be approximately 42.5°.

It will be seen that with the balanced symmetrical construction heretofore described not only will the flow through the flow passage be substantially straight-line or through-conduit flow at all valve-open positions of the closure member, but by reason of the identical configuration and dimensions of both the inlet and outlet orifice slots and their reversed relationship with respect to one another, the orifice area, both at the inlet and outlet ends of the flow passage, will be identical at all open positions, with the result that there will be substantially no pressure drop across the valve when full open. The straight-line character of the flow will, of course, reduce turbulence to a minimum at any opening. This is a highly desirable and important characteristic in a control valve, since it eliminates many of the problems encountered with more conventional types of control valves.

Figure 11:
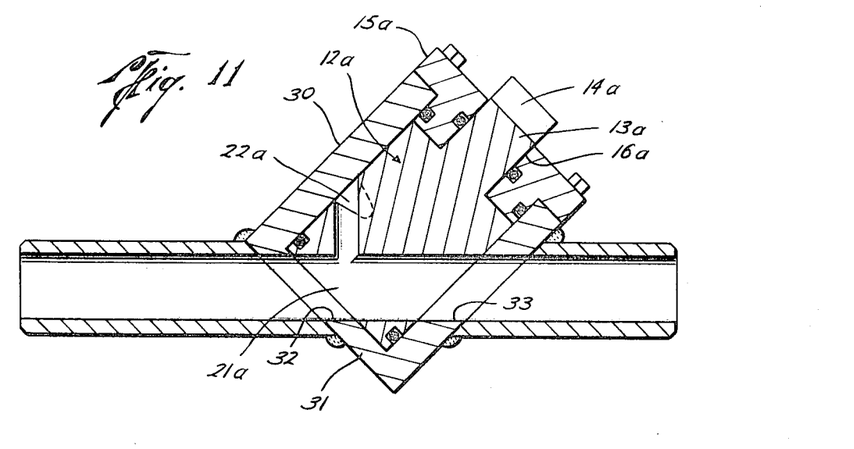
FIG. 11 is a cross-sectional view of another embodiment in accordance with this invention, comprising an angle valve in which the closure member corresponds substantially to one-half the closure member of the embodiment illustrated in FIGS. 1 to 10, inclusive, the closure member being shown in the fully open position.
Figure 12:
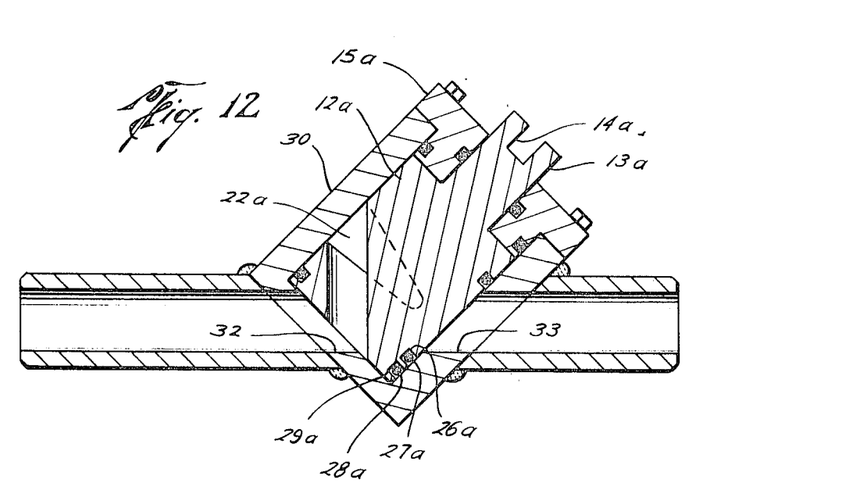
FIG. 12 is a view similar to FIG. 11 showing the closure member in the fully closed position.

FIGS. 11 and 12 illustrate another embodiment in which the closure member corresponds substantially to one-half of the closure member employed in the previously described embodiment.

As illustrated, the valve in accordance with this embodiment comprises a tubular casing 30 closed at one end by an end wall 31 having a flow port 32 therethrough which is coaxial with a flow port 33 in the side wall of casing 30, the common axis of the flow ports being thus disposed at an acute angle to the longitudinal axis of casing 30. A closure member or plug, designated generally by the numeral 12a of cylindrical shape and corresponding generally to one-half of closure member 12, is rotatably mounted in the bore of casing 30 and is provided with a flow passage 21a which opens at one end through the inner end of plug 34 in registry with flow port 32. The flow passage extends generally through the plug at an angle substantially coincident with that of the axis of the flowway defined by flow ports 32 and 33. The opposite end of flow passage 21a terminates in an orifice slot 22a identical in shape and arrangement with one of the slots 22 of the previously described embodiment and which when rotated past flow port 33 as the plug is turned will correspondingly vary the area of the flowway through the valve. The outer end of plug 12a will be provided with a cylindrical operating stem 13a having an operator-connecting notch 14a, extending through an opening 16a in a bonnet 15a which closes the outer end of casing 30.

Plug 12a, in the previously described embodiment, will have a closure portion 25a defined by the nonslotted surface extending between the opposite ends of slot 22a. The closure portion is enclosed by an annular packing 27a, seated in a groove 26a, to seal off about flow port 33 when the plug is rotated to the flowway-closing position, as seen in FIG. 12. The inner end of plug 12 is provided with the circumferential seal packing 28a seated in groove 29a to seal off between the inner end of the plug and the wall of casing 30.

With the angle valve embodiment of FIGS. 11 and 12, it will be seen that substantially straight-line or through-conduit flow through the valve will be provided at all open positions of the plug, that is, at all positions of slot 22a as it is rotated past flow port 33. In this embodiment, however, at any position other than fully open, there will be difference in the area of the flow passage between the inlet and outlet ends thereof, which will produce the desired degree of regulation without loss of all other advantages heretofore described resulting from the angle arrangement and novel flow passage and slot configuration which will be retained in this embodiment.

Figure 13:
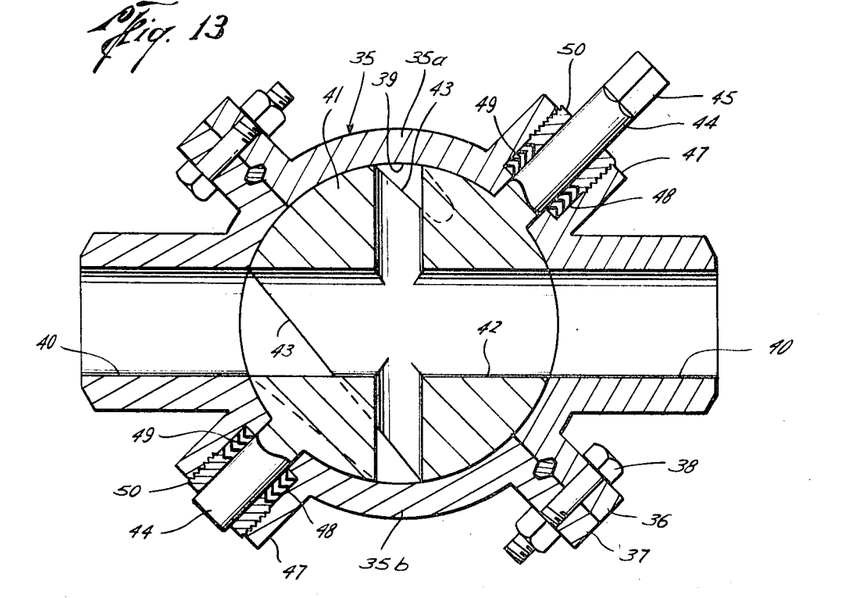
FIG. 13 is a cross-sectional view of a ball-valve embodiment in accordance with this invention, the ball-shaped closure member being shown in the fully open position.
Figure 14:
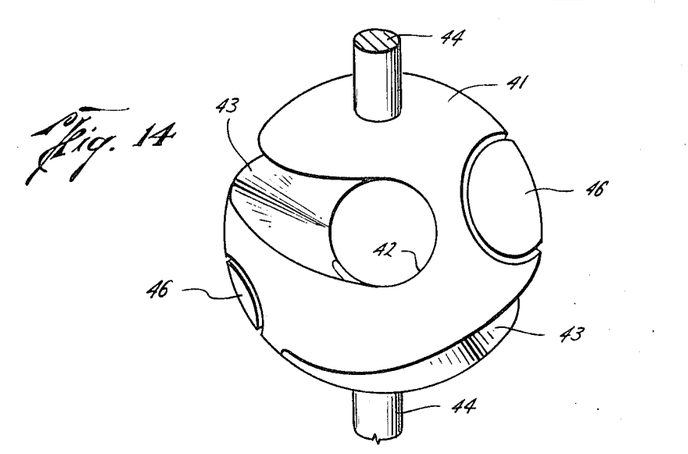
FIG. 14 is a perspective elevational view of the closure member of FIG. 13, viewed at an angle corresponding to the longitudinal axis of the flow passage through the closure member.

FIGS. 13 and 14 illustrate another embodiment in accordance with this invention in which the closure member or plug is ball-shaped.

As illustrated, a generally spherical casing, designated generally by the numeral 35, is constructed of two hemispherical segments 35a and 35b carrying annular mating flanges 36 and 37, respectively, adapted to be connected together by bolts 38. The casing encloses a generally spherical closure-receiving chamber 39. Registering flow ports 40—40 communicate with chamber 39 on diametrically opposite sides of casing 35, being positioned to define a flowway through the casing.

A ball-shaped closure member or plug 41 is rotatably mounted in chamber 39 and is provided with a flow passage 42 which extends generally diametrically of the plug and has its major cross-sectional area substantially equal to that of the flowway defined by flow ports 40—40. The opposite ends of flow passage 42 are defined by spiral orifice slots 43—43 closely similar in convergent and inclined form and arrangement to slots 22 as described above in connection with the embodiment of FIGS. 1 to 10. The nonslotted areas between the ends of each slot define closure portions 46—46 for sealing off about flow ports 40—40 in the flowway-closing position of the plug.

Plug 42 is provided with oppositely extending coaxial cylindrical trunnions or stems 44—44, either one of which may be the operating stem, carrying means, such as the polygonal end portion 45 for connecting to an operator of any suitable and conventional design. Plug 42 will be disposed so that its axis of rotation, as determined by the position of stems 44—44, will be at an acute angle with respect to the longitudinal axis of the flowway defined by flow ports 40—40. Since the shape and disposition of slots 43—43 relative to flow passage 42 will be as described previously, substantially straight-line or through-conduit flow will be effected at all positions of slots 43 when in communication with flow ports 40.

Stems 44 extend through diametrically oppositely extending tubular bosses 47—47 which define stuffing boxes 48—48 carrying seal packing 49—49 held in compression about the stems by annular packing glands 50—50 screwed into the ends of the stuffing boxes.

The ball-shaped structure as described will provide a fully balanced valve having the several important flow control characteristics and other advantages noted in connection with the previously described embodiments.

Figure 15:
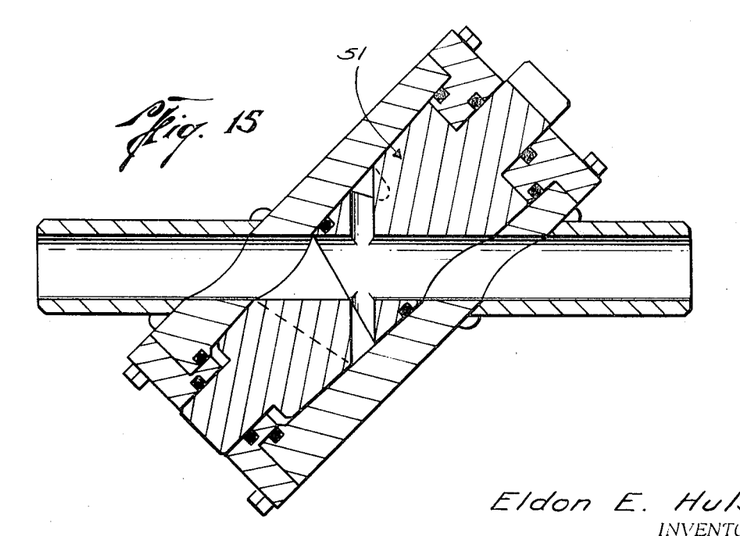
FIG. 15 is a cross-sectional view of another embodiment in accordance with this invention wherein the closure member is of frusto-conical configuration, the valve being shown in the fully open position.
Figure 16:
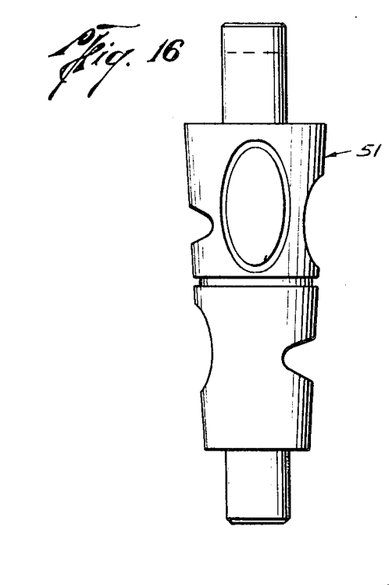
FIGS. 16 and 17 are elevational views at different angular positions of the closure member of FIG. 15.
Figure 17:
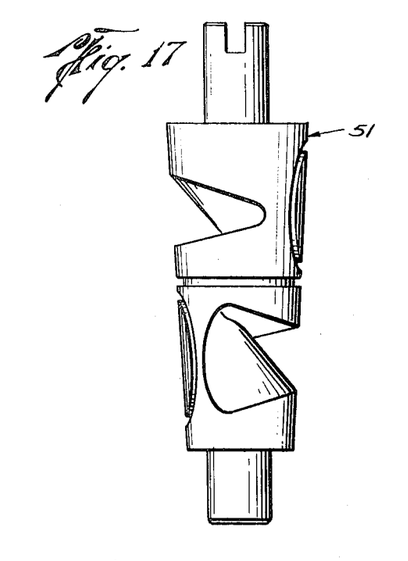

FIGS. 15 to 17 illustrate another embodiment which is almost identical with the embodiment of FIGS. 1 to 10, as illustrated and described above. The principal difference is that instead of employing a closure member which is cylindrical, like closure member 12, the present embodiment employs a plug or closure member 51 which is of a generally frusto-conical or tapered shape. As will be evident from examination of FIGS. 15 to 17, in all other respects, such as the flow passage, orifice slots, closure portions, the angular relations of the flowway, flow passages and orifice slot elements to one another, this embodiment is substantially identical with the embodiment of FIGS. 1 to 10. It is, therefore, deemed unnecessary to describe this embodiment in detail.

With respect to the specific shape of orifice slots 22 in the embodiment illustrated in FIGS. 1 to 10, and the corresponding slots in the other embodiments, it should be noted that while the illustrative configuration is generally triangular with smoothly convergent side walls, the walls, although generally convergent, may be of stepped shape, the individual steps being of the same or different arcuate length providing predetermined orifice areas as may be desired for effecting predetermined degrees of flow control at different angular positions of the closure member.

Still another configuration may comprise a relatively large area section at the full open end of the slot, decreasing sharply to an extended relatively narrow tail section.

One of the most important advantages arising from the described constructions, is that effective flow control may be accomplished through an extended angle of rotation of the closure member up to about 270°. This compares with a maximum rotation of 90° available in the conventional rotary valve which does not, of course, permit the degree of control or regulation possible with valves in accordance with this invention.

From the foregoing, it will be evident that the present invention provides a novel form of rotary valve which is especially useful for controlling or regulating fluid flow over a wide range of volumes and pressure with minimum pressure drop, absence of vibration, minimum erosion and other inadequacies of more conventional control valves.

It is particularly noteworthy that valves in accordance with this invention are exceptionally simple in construction, comprising only a minimum number of parts, making for low cost construction and easy assembly and disassembly. It should also be noted that by reason of the through-conduit configuration of the flow passages, no obstructions will be interposed to the passage of cleaning devices through the flow conduits, so that such operations may be performed without shutting down the flow line or otherwise interfering with fluid flow through the flow lines in which the valves are installed.

The variable orifice control valve, having up to 270° rotation of stem (compared to 90° for a plug or ball valve), allows a considerable wider range of flow coefficient than conventional plug type or ball type control valves.

The wider range of flow coefficient available with the subject invention would allow one valve to handle a wider range of application. For example, a single 8″ variable orifice rotary control valve could satisfactorily handle the same flow range that would otherwise have required an 8″ conventional control valve paralleled with a 4″ conventional control valve, or a 6″ ball valve paralleled with a 3″ ball valve. The dual valve installations previously required would probably require a split range transmitter arrangement or a manual selection of either one valve or the other depending on the flow rate required. In this respect, the single valves with 270° stem rotation would actually provide better resolution and dynamic stability throughout the entire range of flow than would be possible with the dual arrangements.

This feature can be understood when one realizes that the change in flow coefficient per degree of valve stem rotation will always be less for the variable orifice rotary control valve, in accordance with this invention, than for the conventional ball or plug type control valve; for example, the first 90° of rotation would provide much less total change in flow coefficient than for a single conventional type valve of the same size. The second 90° of rotation would provide less change in flow coefficient than the next smaller conventional valve in a parallel control valve installation.

In pressure reducing service, the variable orifice valve will have the unique advantage of constant straight through laminar flow. There will be no bending of the flow pattern, thereby materially reducing the attendant noise characteristic of other pressure reducing valves. This will substantially reduce the high cost of noise abatement in residental areas.

The inlet and outlet of the variable orifice valve will always have the same cross sectional area, thereby giving balanced valve characteristics and reducing the torque necessary to actuate the valve. With reduction of torque it will no longer be necessary to have large, and expensive, valve operators to motorize this valve.

The sensitivity of this valve will be better than any globe type valve because of the constant equality of the inlet and outlet cross sectional area of the plug opening in the balanced-type, symmetrical embodiments heretofore described. It is characteristic of control valves that, when the valve is near the closed position, percentage of total flow changes relatively rapidly, that is, not in a linear fashion, with valve stem travel or valve stem rotation. The flow versus valve rotation curve of the variable orifice valve is essentially linear, even close to the seating position, because of the equality of the inlet and outlet cross sectional area of the plug opening.

An additional advantage of the variable orifice valve, particularly of symmetrical plug embodiments (FIGS. 1–10 and FIGS. 13, 14), is that it may be worked on in the line without removing the actuator from the valve or removing the valve from the flow line. Also, if the upstream seal becomes damaged due to impingement, as frequently occurs to all control valves, the downstream seal can be moved to the upstream position by simply removing the plug from the body, changing ends and replacing the plug. These are tremendous advantages in reducing maintenance and operation costs or pressure reduction stations and flow control processes.

Finally, the plug opening of the variable orifice control valve is pipeline size in the fully opened position. This results in absolutely minimum pressure drop when fully opened.

It will be understood that numerous modifications and variations may be made in the details of valves in accordance with this invention within the scope of the appended claims but without departing from the spirit of this invention.

What I claim and desire to secure by Letters Patent is:
1. A rotary valve comprising:
 (1) a casing defining a closure-receiving chamber having a main axis and having openings communicating with said chamber at spaced points to define a flowway therethrough disposed at an acute angle to the main axis of said chamber,
 (2) a closure member rotatably disposed in said chamber and comprising:
  (a) a body shaped to fit said chamber and having an axis of rotation coaxial with said chamber axis,
  (b) a flow passage extending through said body generally at said acute angle with respect to said axis of rotation whereby to be in register with said openings at the full flowway-open position of said closure member,
  (c) at least one end of said passage defining an elongate slot extending circumferentially of said body and defined by convergent walls inclined to intersect said passage at an acute angle to the axis of said passage,
  (d) said body having a nonslotted portion between the opposite ends of said slot defining a closure portion adapted to close off a flowway opening in the flowway-closing position of the closure member,
  (e) said slot cooperating with the related flowway opening to vary the effective cross-sectional area of the flowway in accordance with the angular position of the slot relative to the opening while maintaining substantially straight-line flow through the flowway at all valve-open positions.

2. A rotary valve according to claim 1, wherein the acute angle at which said slot intersects said passage is substantially equal to but opposite the angle between the axis of said passage and said axis of rotation.

3. A rotary valve according to claim 1, wherein said slot has an arcuate length of from about 90° to about 270°.

4. A rotary valve according to claim 1 having an operating stem projecting from the closure member along said axis of rotation.

5. A rotary valve according to claim 1, wherein said closure member is of generally cylindrical shape.

6. A rotary valve according to claim 1, wherein said closure member is of generally frusto-conical shape.

7. A rotary valve according to claim 1, wherein said closure member is of a generally ball-shape.

8. A rotary valve comprising:
 (1) a casing defining a closure-receiving chamber having a main axis and having openings communicating with said chamber at spaced points to define a flowway therethrough disposed at an acute angle to the main axis of said chamber,
 (2) a closure member rotatably disposed in said cham- and comprising:
  (a) a body shaped to fit said chamber and having an axis of rotation coaxial with said chamber axis,
  (b) a flow passage extending through said body generally at said acute angle with respect to said axis of rotation whereby to be in register with said openings at the flowway-open position of said closure member,
  (c) each end of said passage defining an elongate slot extending circumferentially of said body and defined by convergent walls inclined to intersect said passage at an acute angle to the axis of said passage,
  (d) said body having a nonslotted portion between the opposite ends of each of said slots defining closure portions adapted to close off the related flowway openings in the flowway-closing position of the closure member,
  (e) the slots extending in opposite directions about the body and inclined toward one another and angularly offset with respect to one another so that said nonslotted portions will be on opposite sides of said body,
  (f) said slots cooperating with the related flowway openings to vary the effective cross-sectional area of the flowway in accordance with the angular position of the slots relative to the openings while maintaining substantially straight-line flow through the flowway at all valve-open positions.

9. A rotary valve in accordance with claim 8, wherein said body has cylindrical stems of equal cross-section projecting from opposite ends thereof and coaxial with said axis of rotation.

10. A rotary valve according to claim 9, wherein said body is substantially cylindrical throughout its length.

11. A rotary valve according to claim 9, wherein said body is generally ball-shaped.

12. A rotary valve according to claim 8, wherein said body is substantially cylindrical throughout its length.

13. A rotary valve according to claim 8, wherein said body is generally ball-shaped.

14. A rotary valve according to claim 8, wherein said body is of generally frusto-conical shape.

15. A rotary valve according to claim 8, wherein the acute angle at which said slots intersect said passage is substantially equal to but opposite the angle between the axis of said passage and said axis of rotation.

16. A rotary valve according to claim 8, wherein each of said slots has an arcuate length of from about 90° to about 270°.

References Cited

UNITED STATES PATENTS

| | | | |
|---|---|---|---|
| 1,388,673 | 8/1921 | Trainer | 251—209 |
| 1,638,152 | 8/1927 | Gabriel | 251—209 |
| 2,510,514 | 6/1950 | Mueller | 251—209 |
| 2,902,253 | 9/1959 | Page | 251—209 |
| 2,911,009 | 11/1959 | Parker | 251—310 X |
| 3,240,466 | 3/1966 | Meyer | 251—205 X |

FOREIGN PATENTS

| | | |
|---|---|---|
| 588,396 | 5/1947 | Great Britain. |
| 620,068 | 5/1961 | Canada. |

WALTER A. SCHEEL, *Primary Examiner.*

L. G. MACHLIN, *Assistant Examiner.*